Patented Sept. 13, 1949

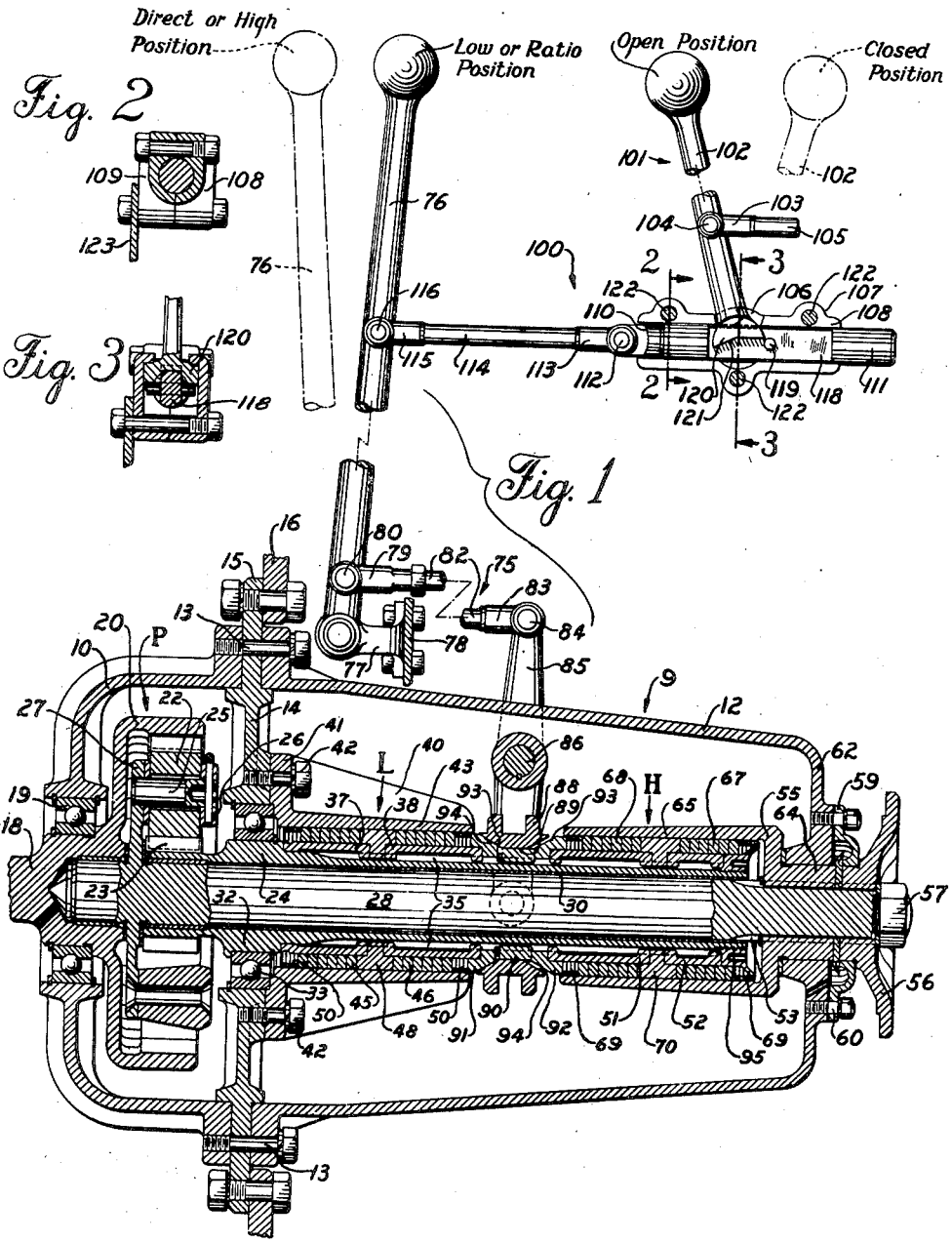

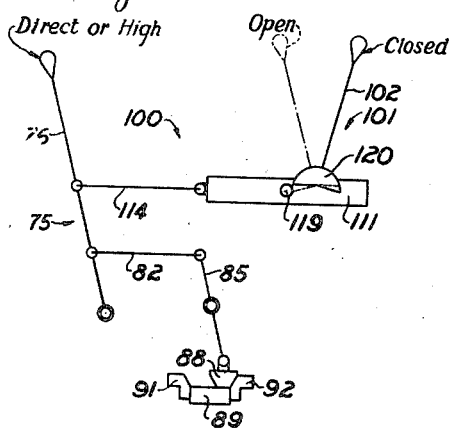
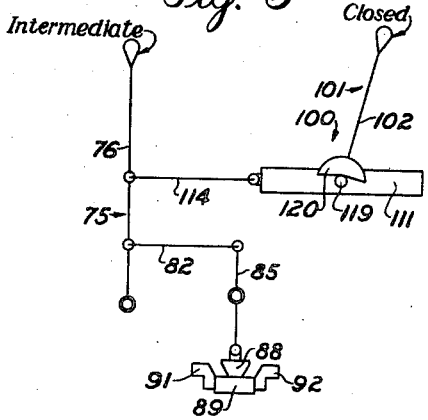
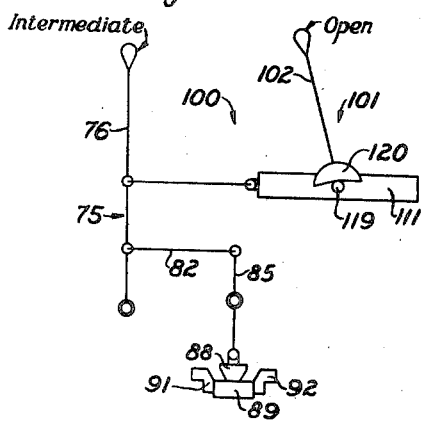
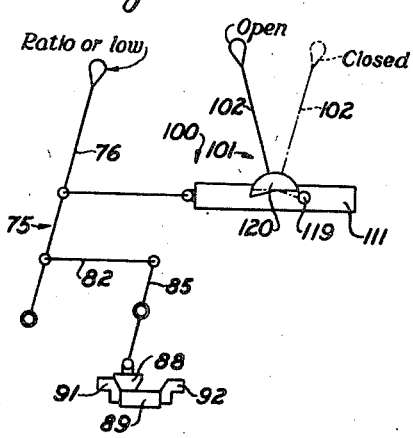

2,481,997

UNITED STATES PATENT OFFICE 2,481,997

TRANSMISSION

Paul V. Haigh and Winthrop S. Horton, South Bend, Ind., assignors to Studebaker Corporation, South Bend, Ind., a corporation of Delaware Application July 18, 1945, Serial No. 605,732

13 Claims. (Cl. 74—781)

The present invention relates to an improvement in a transmission, and to mechanism for controlling changing of the gear ratio of the transmission.

The transmission and control mechanism of our invention has particular utility for use in airplanes wherein it is desirable to provide for two speed ratios of drive to a propeller.

It is essential when providing different speed ratios of drive to an airplane propeller that the transmission and shift mechanism be of a character to prevent the propeller from becoming free of the engine when shifting from one gear ratio to another gear ratio or to permit the propeller at any time to overrun the engine, for if these conditions occurred the pilot would not have adequate control of the airplane.

Accordingly it is an object of our invention to provide a transmission in which change of gear ratio may be effected between driving and driven shafts, or input and output shafts, without breaking of the torque line between the shafts in either direction of torque flow between the shafts and through the transmission.

A further object of our invention is to provide a transmission which may be actuated by the manipulation of a throttle for controlling the speed of the engine with which the transmission is associated.

A further object is to provide a transmission and control mechanism therefor in which the control mechanism includes interlocking means preventing changing of the gear ratio of the transmission until the throttle for controlling the speed of the engine is in predetermined position and in accord with the change to be effected in the gear ratio of the transmission.

A further object is to provide a transmission and control mechanism therefor in which the control mechanism includes interlocking means for preventing shifting directly from one gear ratio to another gear ratio through the transmission without predetermined manipulation of the throttle.

A further object is to provide a transmission having means including a transmission shift lever for selectively actuating the transmission to provide a desired gear ratio therethrough, and interlocking means between the transmission shift lever and a throttle for the engine for preventing shifting of the transmission shift lever to prevent shifting from one gear ratio to another gear ratio except by predetermined manipulation of the throttle.

A further object is to provide a transmission mechanism includes a transmission shift lever and control mechanism therefor, which control for selecting the desired gear ratio of drive through the transmission, and a throttle interconnected with the transmission shift lever and arranged therewith to be operable from fully open to fully closed positions in a selected position of the transmission shift lever without effecting change of the selected gear ratio of the transmission.

A further object is to provide a transmission and control mechanism therefor, which control mechanism includes a transmission shift lever for selecting a desired gear ratio of drive through the transmission, and a throttle interconnected with the transmission shift lever and arranged so that the transmission shift lever cannot be shifted in one continuous movement to change the gear ratio through the transmission without predetermined manipulation of the throttle.

In order to accomplish the aforesaid objects, we propose to provide a transmission of the planetary gear type comprising a planetary or epicyclic gear mechanism between the driving and driven shafts or input and output shafts, of the transmission. The planetary or epicyclic gear mechanism provides for two gear ratios through the transmission, i. e., either a ratio drive, as by holding one of the elements of the planetary gear mechanism against rotation, or direct drive therethrough, as by locking two of the elements of the planetary gear mechanism together so that the entire gear mechanism rotates at a one-to-one ratio. To accomplish this we have arranged with a planetary gear mechanism, a coil spring clutch and brake of the now well known L. G. S. type in a manner which will be described in detail hereinafter, so that the transmission either provides for ratio drive or direct drive therethrough under the selection of an operator. The arrangement of the coil spring clutch and brake is such that at no time is there a "neutral" condition in the drive, and in either speed the drive is bi-directional, i. e., there is no free-wheeling of the driving and driven. or input and output shafts with respect to each other.

In the preferred form of our invention the planetary gear mechanism is arranged so that the ring gear thereof is adapted to be driven by an engine with the driven shaft being attached to or forming a part of the planet carrier. Thus in low or ratio, the sun gear is adapted to be held stationary, while in high or direct drive the sun gear is locked to the planet carrier so that the entire planetary gear mechanism turns at a one-to-one ratio. Two coil spring means are mounted on the sun gear shaft, and each means comprises two coil spring sections whereby each means is bi-directional when the two coil spring sections of each means are actuated. One of the means acting as a brake is arranged between the sun gear shaft and a stationary member of the transmission housing or case, so that it is effective to hold the sun gear of the planetary gear unit stationary to effect ratio drive, while the other means acting as a clutch is arranged between the sun gear shaft and the planet carrier to lock these members to each other to effect direct drive through the transmission.

The brake means providing for low or ratio drive comprises a first coil spring section operable upon flow of torque from the driving shaft to the driven shaft to hold the sun gear against rotation. The clutch means providing for high or direct drive comprises a first coil section operable upon flow of torque from the driven to the driving shaft to lock the planet carrier to the sun gear to effect direct drive. One of these first coil sections of each of the clutch and brake means is thus operable to provide for the positive connection of the driving and driven shafts regardless of the direction of torque flow through the transmission. The arrangement is such that when one of the first coil spring sections of either the brake or clutch means is engaged, the other overruns. As above indicated, the brake and clutch means each includes a second coil spring section which is adapted to be energized to provide definite selection of a gear ratio through the transmission independent of the direction of the flow of torque through the transmission.

Suitable transmission shift means is provided for selectively actuating either of the second coil spring sections of the brake or clutch means, as desired. Upon actuation of the second coil spring brake section of the brake means providing for ratio or low drive by the transmission shift lever, the transmission remains in low or ratio drive even if the driven shaft tends to drive the drive shaft. Likewise, upon manipulation of the transmission shift means to actuate the second coil spring section of the direct drive or high clutch means, the transmission remains in direct or high even though the drive shaft tends to drive the driven shaft.

The transmission shift means is thus operable for effecting either ratio or direct drive through the transmission. In the intermediate position of the transmission shift means, in which neither the second coil spring sections of either of the brake or clutch means is actuated, one or the other of the first coil spring sections is actuated by the flow of torque through the transmission in either direction therethrough so that the transmission at no time is adapted to free wheel.

In this arrangement of a planetary gear mechanism and low and high speed clutch and brake means, we provide a throttle control means and suitably interlock means between it and the transmission shift means so that the transmission shift means cannot be moved in one continuous movement from low or ratio, to high or direct, or vice versa. The interlock arrangement is such that if it is desired to shift the transmission shift means to effect a shift from ratio or low, to direct or high, it is necessary to position the throttle to open position, after which the transmission shift means may be moved to its intermediate position, followed then by moving of the throttle means to closed position before the transmission shift lever may be shifted to effect direct drive through the planetary gear mechanism. Conversely, in shifting from high or direct to low or ratio, the throttle must be first brought to closed position, in which position the transmission shift means may be brought to its intermediate position, and before completion of shifting movement of the transmission shift means to high or direct drive the throttle must be brought to its open position.

This sequence of movements of the transmission shift means and throttle means are for the purpose of preventing premature engagement of the second coil spring sections of either of the brake or clutch means until the throttle is able to provide for the proper direction of torque flow through the transmission corresponding to the shift being made, so that the first coil spring sections of either of the brake or clutch means have first been actuated correspondingly to the actuation which is to be made of the second coil spring sections by the shifting of the transmission shift means. In other words, in shifting from ratio or low, to high or direct, it is essential that the first coil spring section of the high or direct clutch means be actuated to lock the sun gear shaft and planet carrier together for conjoint rotation, which will be achieved by positioning the transmission shift lever to its intermediate position and bringing the throttle to closed position so that the driven shaft tends to drive the drive shaft after which the second coil spring section of this clutch may be actuated to provide for direct drive under any desired position of the throttle. Likewise, in shifting from high or direct, to ratio or low, it is essential that the first coil spring section of the low or ratio brake means be actuated to hold the sun gear stationary. This first coil spring section of the low or ratio brake means is actuated by bringing the transmission shift lever to intermediate position and opening of the throttle so that the drive shaft tends to drive the driven shaft, after which the shifting of the transmission shift means may be completed to actuate the second coil spring section of the low or ratio brake means so that ratio drive is provided under any subsequent position of the throttle or direction of torque flow between the drive or driven shafts.

The time element necessary to cause the overrunning end of the first coil spring section of either of the brake or clutch means to cause one of said first coil spring sections to disengage and the other to engage after the torque flow direction has been reversed will be very small. This time element will be less than the time required to move the throttle its full travel from fully open to fully closed position, or vice versa, whereby it will be safe to shift the transmission shift means after change in throttle position and engage the second coil spring section of the brake or clutch means whose first coil section is now actuated or engaged.

Other objects and advantages of our invention will appear from the detailed description.

Now in order to acquaint those skilled in the art with the manner of constructing and utilizing a transmission and control mechanism therefor in accordance with our invention, we shall describe in connection with the accompanying drawings a preferred embodiment of our invention.

In the drawings:

Figure 1 is a vertical sectional view of a transmission constructed in accordance with our invention, certain parts being shown in elevation, and further illustrating the mechanism for controlling actuation of the transmission;

Figure 2 is a detail vertical sectional view taken substantially on the line 2—2 of Figure 1, looking in the direction indicated by the arrows;

Figure 3 is a detail sectional view taken substantially on the line 3—3 of Figure 1, looking in the direction indicated by the arrows;

Figure 4 is a diagrammatic view illustrating the position of the parts of the control mechanism for the transmission of Figure 1, to provide for direct or high drive through the transmission irrespective of the position of the throttle;

Figure 5 is a diagrammatic view of the shift control mechanism showing an intermediate position of the transmission shift lever and the throttle in closed position, in which the transmission is normally in high or direct drive;

Figure 6 is a view similar to Figure 5, but showing the throttle means of the control mechanism in open position, in which position the transmission normally is in low or ratio drive; and Figure 7 is a view similar to Figure 6, with the control mechanism positioned to provide for low or ratio drive through the transmission irrespective of the position of the throttle.

Referring now to Figure 1 we have shown in an embodiment of our invention selected for illustration, a transmission housing 9 formed by a pair of open-ended casing sections 10 and 12, which are secured together adjacent their open ends by a plurality of bolts 13 and between which is secured a partition wall or plate member 14. The outer end flanges 15 of the plate member 14 are adapted to be secured to a stationary wall or partition 16 of a machine, such as an airplane, with which the transmission is incorporated. A drive shaft 18 is suitably journaled in a bearing race 19 in a bearing boss provided in the end wall of the casing section 10. It will be understood that the drive shaft 18 has suitable connection with an internal combustion engine or the like, and that in the specific application of the transmission of our present invention herein disclosed the drive shaft 18 has connection to the crank shaft or other driving shaft of an airplane engine or the like. At its outer end the drive shaft 18 is formed with a ring gear 20 of a planetary gear set P, but it will be understood that the ring 20 may be formed as a separate member and suitably connected to the drive shaft 18 if desired. The teeth of the ring gear 20 have meshing engagement with the teeth of a plurality of single planet pinions 22, only one of which is shown in the drawings, which, in turn, have meshing engagement with a sun gear 23 formed integral with and at the inner end of a sun gear shaft 24. It will also be understood, however, that the sun gear 23 and sun gear shaft 24 may be separate members and suitably secured together. The planet pinions 22 are journaled for rotation about pins 25 having their opposite ends fixed in a pair of plate members 26 and 27 to provide for rotatable mounting of the planet pinions. The plate member 27 of the planet carrier is preferably formed integrally with the planet carrier shaft or driven shaft 28 for the transmission. The ring gear 20, planet pinions 22 and the carrier therefor, together with the sun gear 23 constitute a known type of planetary gear mechanism which, as is well understood in the art, provides for two gear ratios therethrough, as, for example, by holding the sun gear against rotation with the drive coming in through the ring gear a ratio drive of the planet pinion carrier and the driven shaft connected thereto is effected. In the form of planetary gear mechanism shown at P, locking or connecting of the planet pinions with the sun gear provides for locking up the planetary gear system to provide a direct drive from the drive to the driven shaft.

As shown, the driven shaft 28 having connection to the planet pinion carrier extends axially lengthwise of the transmission housing 9. The sun gear shaft 24 is journaled upon the driven shaft by means of a cylindrical bushing 30 extending coaxially of said shaft and lying therebetween. The sun gear shaft 24, adjacent the sun gear 23 and outwardly thereof, is provided with an enlarged bearing portion 32 between the outer cylindrical surface of which and a circular opening in the plate or partition member 14 a ball bearing assembly 33 is arranged to provide for journaling of the inner end of the sun gear shaft 24. The sun gear shaft 24 outwardly of the enlarged bearing portion 32 is splined, as at 35, providing for keying thereto of a pair of axially aligned inner and outer annular sleeve members 37 and 38 of a low or ratio brake means indicated generally at L. The outer end of the annular member 37 is turned inwardly, which annular inwardly turned flange of the member is suitably internally splined for engagement with the splines 35 of the sun gear shaft 24. The inner end of the annular member 37 has abutting engagement with a shoulder formed by the enlarged bearing portion 32 of the sun gear shaft. The low or ratio brake means L comprises a stationary annular sleeve member 40 having a radially extending flange 41 at its inner end, which flange is secured to the inner peripheral portion of the partition 14 by a plurality of circumferentially spaced bolts 42 to hold the member 40 stationary and as part of the transmission housing 9. The stationary member 40 thus comprises an annular sleeve 43 extending coaxially of the driven and sun gear shafts, and is spaced from the external annular surface of the members 37 and 38 to provide therebetween an annular recess receiving a pair of coil spring brakes 45 and 46, respectively. The coil spring brakes 45 and 46 comprise first and second coil spring sections of the low or ratio brake means L, and at their ends extending inwardly of the annular sleeve 43 of the stationary member 40 are secured to an anchor member 48, which annular anchor member 48 is provided with an inwardly extending radial flange having internal splines for engagement with the splines 35 of the sun gear shaft. The coil spring brakes 45 and 46, at their other ends, are each provided with a conventional teaser spring 50 of known construction.

The transmission also comprises a clutch means H hereinafter referred to as the direct drive or high clutch means, and it will be observed that it also comprises a pair of cylindrical sleeve members 51 and 52, extending coaxially of the sun gear shaft and provided with inturned radial ends having suitable internal splines for engagement with the splines of the sun gear shaft 24. The outer end of the driven shaft 28 is splined, as at 53. A suitable driven flange member 56 is also splined to the outer end of the driven shaft 28 and is secured thereto by a nut 57 having threaded engagement on the threaded outer end of the driven shaft 28. An end cap member 59 is suitably secured to the outer end of the housing section 12 of the transmission housing 9 by a plurality of bolts 60 which extend into and have threading engagement with the radially inwardly extending outer wall 62 of the transmission housing section 12. The inner cylindrical surfaces of the bearing boss of the end wall 62 and the end cap member provide for rotatably supporting the hub portion 64 of the collar member 55, and the hub portion of the driven flange means 56 to rotatably support the outer end of the driven shaft 28.

The collar 55 comprises an inwardly extending cylindrical sleeve portion 65, the inner cylindrical clutch surface of which is spaced from the outer cylindrical surface of the sleeve members 51 and 52 to provide an annular recess therebetween, and in which recess a pair of first and second coil spring sections 67 and 68 respectively, of the direct drive or high clutch means H are disposed. The inner ends of the pair of coil spring sections 67 and 68 intermediate of the cylindrical sleeve portion 65 of the collar 55 are connected to an annular anchor member 70 which is formed with an inwardly extending radial flange suitably internally splined for engagement with the splines 35 of the sun gear shaft 24. The coil spring sections 67 and 68, at their other ends, are each provided with a conventional teaser spring 69.

For purposes of the present disclosure, it is assumed that the drive shaft 18 is rotating in a right hand direction, or clockwise, as viewed from the power-in end, i. e., looking at the transmission inwardly of the drawing from the left-hand side thereof. With the drive shaft 18 rotating in this direction the ring gear 20 and the planet pinion carrier 27 are also rotating in this direction with the sun gear held stationary so that the shaft 28 connected to the planet carrier, or the driven shaft, is also rotating in the right hand direction. With this direction of rotation, the first and second coil spring sections 45 and 46 of the ratio brake means L and the coil spring sections 67 and 68 of the direct drive or high clutch means H are wound in a right hand direction as viewed from the power-in end of the transmission as aforesaid. The operation of the transmission as thus far described with the arrangement of a first coil spring section 45 of the low or ratio brake L, and with the arrangement of the first coil spring section 67 of the high or direct drive clutch means H as described is such that, when torque flow through the transmission is from the drive shaft 18 to the driven shaft 28, the first coil section 45 of the low or ratio brake L will be radially expanded into engagement with a portion of the brake surface of stationary member 40 to hold the sun gear shaft 24 and the sun gear at the inner end thereof against rotation so that the planet carrier drives the driven shaft 28, connected thereto, at low or ratio drive. In the preferred arrangement of our invention and in accordance with a transmission constructed in accordance therewith, the number of teeth of the ring gear, planet pinion, and the sun gear were such that the unit had a speed reduction of 1.4286:1. Now with torque flow being from the drive shaft 18 to the driven shaft 28, the first coil spring section 67 of the high or direct drive clutch means H will overrun. If a condition should now arise so that the driven shaft 28 tends to overrun the drive shaft 18, it will be observed that the teaser spring 69 at the outer end of the first coil spring section 67 of the high or direct drive clutch means H will be energized to radially expand the coil spring section 67 into engagement with the cylindrical clutch surface of the sleeve 65 of the collar, 55, which will lock or clutch the planet pinion carrier with the sun gear to provide for direct drive between the driving and driven shafts. This condition of torque flow from the driven shaft 28 to the drive shaft 18, causing radial expansion of the first coil spring section 67 of the high or direct drive clutch means H, will result in overrunning of the first coil spring section 45 of the low or ratio brake means L. It will thus be observed that, irrespective of whether the torque flow is from the drive shaft 18 to the driven shaft 28, or from the driven shaft 28 to the drive shaft 18, either the first coil spring section 45 of the low or ratio brake means L, or the first coil spring section 67 of the high or direct drive clutch means H will be energized so that there is no time when the driving and driven shafts are free of each other. Thus the construction so far described provides for either ratio or direct drive in the right hand or clockwise direction of rotation of the shafts 18 and 28 as viewed from the power-in end of the transmission, depending upon the direction of torque flow through the transmission.

In order to provide for selection of either ratio drive or direct drive at the will of the pilot of an airplane or the like, irrespective of the direction of torque flow between the driving and driven shafts, we provide a transmission shift means, indicated generally at 75, which comprises a transmission shift lever 76 pivoted at its lower end to an ear 77 of a stationary plate member, which is suitably secured for convenient manipulation of the transmission shift lever by the pilot on a stationary panel or frame member 78 of the airplane. A clevis 79 has pivotal connection at 80 to the transmission shift lever 76, which clevis is connected by a rod 82 having a clevis 83 at its outer end which has pivotal connection at 84 with a lever 85 pivoted intermediate its ends on a pivot pin 86 supported in any suitable manner by or in juxtaposition of the transmission housing section 12 to extend thereinto. At its lower end the lever 85 is provided with a yoke portion 88, the internal or cylindrical surface 89 of which is adapted to have sliding movement on a collar 90 suitably provided with internal splines for connecting the collar 90 with the sun gear shaft 24 intermediate the second coil spring section 46 of the low or ratio brake means L and the second coil spring section 68 of the high or direct drive clutch means H. A pair of ring members 91 and 92 are provided adjacent the teaser springs 50 and 69 of the second coil spring sections 46 and 68 of the low and high brake means and clutch means L and H, respectively, and the ring sections 91 and 92 are freely journaled upon the adjacent ends of the sleeves 38 and 51 of the two means L and H, respectively. The ring members 91 and 92 are provided with tapered frictional surfaces 93 which are adapted to be engaged, selectively, by the correspondingly tapered pair of friction surfaces 94 of the yoke portion 88 of the lever 85. A nut 95 threaded on the outer threaded end of the sun gear shaft 24 provides for retaining the several sleeves 37, 38, 51, 52, anchor members 48 and 70, the collar 90 and the ring members 91 and 92 in assembled relation on the sun gear shaft. As shown in full lines in Figure 1, the transmission shift lever 75 has been shifted to its right hand position, as viewed in the drawing, so that the left hand tapered surface 94 of the yoke 88 is in engagement with the correspondingly tapered surface 93 of the ring member 91, which engagement of the ring member 91 holds the latter against rotation. The ring member 91 is formed, as is well known in the art, to engage the free end of the teaser spring 50 of the second coil spring section 46 to hold this end of the spring against rotation. Now with the transmission shift lever in the position shown in Figure 1 of the drawings it will be observed that the low or ratio brake means L is locked so that the drive shaft 18 and driven shaft 28 will be connected to provide ratio drive through planetary gearing P regardless of the direction of torque flow through the transmission. Assuming that the torque flow is from the drive shaft 18 to the driven shaft 28 it will be observed that the first coil spring section 45 is expanded radially to hold the sun gear shaft 24 and the sun gear 23 connected thereto against rotation to provide the ratio drive between the drive and driven shafts. Now with the free end of the teaser spring 50 of the second coil spring section 46 held against rotation, as by engagement of the conical tapered surfaces 93 and 94 of the fork arm 88 and the ring member 91, and the flow is from the driven shaft 28 to the drive shaft 18 the second coil spring section 46 will be radially expanded into brake engagement with a portion of the brake surface of the stationary member 40, the expansion of which by virtue of the sleeve member 38 being keyed to the sun gear shaft 24 is still effective to restrain the sun gear 24 against rotation so that the drive and driven shafts are connected for ratio drive through the planetary gear system P. Thus, by the provision of the second coil spring section 46 with the low or ratio brake L, together with the transmission lever 76 shown in the full line position of Figure 1, the transmission is selectively operable to provide for ratio drive between the drive and driven shafts irrespective of the direction of torque flow through the transmission. Likewise upon movement of the transmission shift lever to the dotted line position shown in Figure 1, it will be observed that the right hand tapered conical surface 94 of the yoke 88 will engage the tapered conical surface 93 of the ring member 92 so as to engage the free end of the teaser spring 69 of the second coil spring section 68 of the high or direct drive means H to lock up the clutch means H to provide for direct drive between the drive and driven shafts irrespective of the direction of torque flow through the transmission and between the shafts. Thus, assuming that the direction of torque flow through the transmission is from the driven shaft 28 to the drive shaft 18 which, as previously described, causes radial expansion of the first coil spring section 67 of the clutch means H to lock the planet carrier to the sun gear to provide the direct drive through the transmission, and tendency for the drive shaft 18 to drive the driven shaft 28 will result in actuation of the second coil spring section 68 of the high or direct drive clutch means H to maintain the planet carrier and sun gear in locked relation, and thus provide direct drive between the drive and driven shafts.

As previously referred to, it is desirable, particularly in providing a two-speed transmission for an airplane propeller or the like, that a definite interlocking means be arranged between the throttle means for controlling the speed of an internal combustion engine which, as previously mentioned has connection to the drive shaft 18 of the transmission so that the pilot cannot effect actuation of the transmission from ratio to direct drive, or vice versa, without a predetermined sequence of movements of the throttle means and the transmission shift means.

We have, therefore, provided an interlock means, indicated generally at 100, between the transmission shift means 75 and the throttle control means indicated generally at 101. The throttle means 101 comprises a throttle lever 102, to which lever 102 a clevis 103 is pivotally mounted as at 104. A rod or link 105 has connection with the clevis 103 and extends to any suitable control mechanism for controlling flow of fuel to the internal combustion engine in a manner now well known in the art. The lower end of the throttle lever 102 extends through an opening 103 in a housing 107 comprising a pair of complementary housing members 108 and 109 which are suitably formed to provide a substantially cylindrical recess 110 in which a shaft 111 is mounted for sliding movement. The shaft 111, at its inner end, is pivotally connected at 112 to a clevis 113 from which a rod 114 extends to a clevis 115 which is pivotally connected intermediate the ends of the transmission shift lever 76 as at 116. The shaft 111, intermediate its ends, is provided with a reduced or an intermediate section 118 of substantially rectangular cross section, and a pin 119 extends transversely of the axis of the shaft centrally of the portion 118 of rectangular cross section. The lower end of the throttle lever 102 is provided with a yoke member 120, the end surfaces of which are formed with substantially inverted V-shaped notches 121. It will be observed more clearly from Figure 3 that the arms of the yoke member 120 extend along side of the rectangular cross sectional portion 118 of the shaft 111, and the V-shaped notches 121 are provided for engaging the opposite outer ends of the pin 119 to provide for movement of the transmission shift lever 76 in certain predetermined sequences depending upon the position of the throttle lever 102. A plurality of bolts 122 are provided for securing the two complementary portions of the housing 108 together, with the lower bolt 122 providing for mounting of the housing 108 stationarily to a suitable frame member 123 fixed to the airplane.

Reference may now be had to Figures 4 through 7 for a description of the interlock means 100 between the throttle means 101 and the transmission shift means 75. Referring first to Figures 5 and 6, it will be observed that the transmission shift lever 76 is in an intermediate position in which ratio or direct drive through the transmission is dictated by the direction of torque flow through the transmission. Thus, for example, with the transmission shift lever 76 in intermediate position, as in Figure 5, and with the throttle lever 102 in its right hand position, which position is the closed position of the throttle, the ends of the pin 119 seat in the apex of the V-shaped notches of the yoke 120 at the lower end of the throttle lever 102. In the position of Figure 5, with the throttle closed, normally there will be a tendency for the driven shaft to drive the drive shaft so that the coil spring section 67 of the high or direct drive clutch means H is expanded radially to provide for direct drive between the driving and driven shafts of the transmission.

In Figure 6, with the throttle lever 102 to the left, or open position of the throttle, normally the torque flow through the transmission will be from the drive shaft to the driven shaft, so that the first coil spring section 45 of the low or ratio brake means L is radially expanded to hold the sun gear of the planetary gear system P against rotation, providing ratio drive through the transmission.

In the normal operation of the transmission the intermediate or central position of the transmission shift lever 76, as shown in Figures 5 and 6, is normally only a momentary position of the lever, but it will be observed that the pilot, by positioning the transmission shift lever in this intermediate position, will be able to control either ratio or direct drive by manipulation of the throttle lever 102. In the intermediate position of shift lever 76 the throttle lever 102 is freely movable to either open or closed positions, or in positions intermediate thereof, since the ends of the pin 119 carried on the shaft 111 are resting in the apex of the V-shaped notches formed at the lower ends of the arms of the yoke 120.

A comparison may now made between Figures 4 and 5 in which it will be observed in Figure 5 that, with the throttle in closed position, the transmission shift lever cannot be moved to the right as viewed in Figure 5, to effect ratio drive since the ends of the pin 119 engage a downwardly extending portion of the V-shaped notches in the arms of the yoke member 120. However, with the position of the parts as shown in Figure 5, the transmission shift lever 76 may be moved to the left to provide for engagement, as shown in Figure 4, of the ring member 92 by the right hand tapered friction surface 94 of the yoke member 88 to hold the ring member 92 against rotation, and thereby condition the second coil spring section 68 of the high or direct drive clutch H for actuation. Now with the shift lever 76 positioned to the left as shown in Figure 4, the first and second coil spring sections 67 and 68 are conditioned to lock the transmission in direct drive. Shifting of the transmission shift lever 76 to its left hand position causes lateral shifting of the pin 119 so that it is clear of the yoke member 120 of the throttle lever 102 so that with the high or direct clutch means H actuated the throttle lever 102 is freely movable from open to closed positions. The open position of the throttle lever 102 is indicated in dotted lines in Figure 4. Thus the speed of the engine is under the control of the pilot when the transmission is conditioned to provide direct drive. Now in order to shift the transmission shift lever 76 to effect ratio drive it will be observed from Figure 4 that it is essential that the throttle lever 102 be brought to closed position after which the transmission shift lever may be brought to the intermediate position as shown in Figure 5. Thereafter the throttle lever 102 may be swung to the left, or to the position shown in full lines in Figure 6, whereupon the transmission shift lever 76 may be shifted from its intermediate position to the right as shown in the full line position in Figure 7 to effect engagement of the ring member 91 for the second coil spring section 46 of the low or ratio brake means L. It will be observed that in effecting ratio or low drive the throttle is in open position so that the flow of torque will be from the drive shaft to the driven shaft. After shifting in the sequence above described has occurred, and the transmission shift lever 76 is in its right hand position, the pin 119 has been shifted laterally beyond the adjacent end of the yoke 120 of the throttle 102, so that after ratio or low has been definitely selected, the throttle may be manipulated from fully open to fully closed positions at the option of the operator. The open position of the throttle with the transmission locked in ratio or low drive is indicated in dotted lines in Figure 7. It will also be observed that, if it is now desired to shift from ratio or low to direct or high, the transmission shift lever 76 must first be brought to its intermediate position as shown in Figure 6 with the throttle in open position. Now with the transmission shift lever brought to its intermediate position, and the throttle in its open position, the transmission shift lever cannot be shifted to the left to effect direct or high drive until the throttle is brought to its closed position shown in Figure 5. It will thus be observed that, by reason of the V-shaped notches in the forked end member 120 of the throttle lever 102, the transmission shift lever 76 is prevented from being shifted in one continuous movement from low or ratio drive, to direct or high drive, or vice versa, and also the transmission shift lever 76 is prevented from being moved at all if the throttle is not either in opened or closed position, depending upon the shift to be made. The procedure necessitated by this provision of the interlock means requires that the transmission shift lever be first moved to an intermediate position, and then, only after the throttle position has been changed in accordance with the shift to be made, can the transmission shift lever be moved to cause engagement of the locking end of the clutch or brake whose overrunning end is now engaged. The angle of the notch in the yoke member of the throttle lever 102 is such as to prevent any movement at all of the transmission lever 76 except when the throttle lever is either fully opened or fully closed, thus preventing premature engagement of either locking end of either of the second coil spring sections 46 or 68 of either the brake or clutch means L and H. This construction is provided to allow for the time element necessary to cause the overrunning end of one coil means to disengage and the other to engage after torque flow direction has been reversed, but the time element will be smaller than the time element required to move the throttle from fully open to fully closed positions, or vice versa, so that it will be safe to move the transmission shift lever after the change in throttle position has occurred and engage the locking end of the coil means whose overrunning end is now engaged.

While we have shown what we consider to be the preferred embodiment of our invention, it will be understood that various modifications and rearrangements may be made therein without departing from the spirit and scope of the invention.

We claim:

1. In a transmission, a planetary gear system comprising three elements, namely, a sun gear, a ring gear, and a planet carrier having pinions meshing with said sun and said ring gears, a drive shaft connected to one of said elements, a driven shaft fixedly connected to a second of said elements, brake means including a coil spring having one end fixed to the third element of said planetary gear system operable for holding said third element stationary to effect a ratio drive from one of said shafts to the other shaft, clutch means between said second and third elements of said planetary gear system including a coil spring having one end fixed to said third element and operable for connecting said second and third elements together to effect direct drive from one of said shafts to the other shaft, said first brake means being operable by torque flow in one direction through said planetary gear mechanism, and said clutch means being operable by torque flow in the other direction through said planetary gear mechanism.

2. In combination, a transmission comprising driving and driven shafts, gear means between said driving and driven shafts providing for two speed ratios between said shafts, brake means including a first brake operable by torque flow from said driving shaft to said driven shaft to effect one of said two speed ratios through said gear means, clutch means including a first clutch operable by torque flow from said driven shaft to said driving shaft to effect the other of said two speed ratios through said gear means, said brake means including a second brake, said clutch means including a second clutch, and transmission shift means for selectively actuating either said second brake or said second clutch, said second brake or said second clutch upon actuation thereof being effective to render its associated brake or clutch means operative to maintain the speed ratio provided thereby through said gear means independent of the direction of torque flow between said driving and driven shafts.

3. In combination, a transmission comprising driving and driven shafts, gear means between said driving and driven shafts providing for two speed ratios between said shafts, brake means including a first brake operable by torque flow from said driving shaft to said driven shaft to effect one of said two speed ratios through said gear means, clutch means including a first clutch operable by torque flow from said driven shaft to said driving shaft to effect the other of said two speed ratios through said gear means, said brake means including a second brake, said clutch means including a second clutch, transmission shift means for selectively actuating either said brake or said second clutch, said second brake or said second clutch upon actuation thereof being effective to render its associated brake means or clutch means operative to maintain the speed ratio provided thereby through said gear means independent of the direction of torque flow between said driving and driven shafts, a throttle control means adapted to control the speed of an engine with which the drive shaft of said transmission is adapted to have connection, and interlocking means between said throttle control means and said transmission shift means for preventing shifting of the latter except in predetermined positions of said throttle control means.

4. In a transmission, a planetary gear system comprising three elements, namely, a sun gear, a ring gear, and a planet carrier having planet pinions meshing with said sun and ring gears, a drive shaft connected to said ring gear, a driven shaft connected to said planet carrier, brake means associated with said sun gear and including a first brake operable by torque flow from said drive shaft to said driven shaft to hold said sun gear against rotation to provide ratio drive between said shafts, clutch means associated with said sun gear and said driven shaft and including a first clutch operable by torque flow from said driven shaft to said drive shaft to connect said sun gear and said planet carrier together for conjoint rotation to effect direct drive between said shafts, said brake means including a second brake, said clutch means including a second clutch, means for selectively actuating either said second brake or said second clutch, actuation of said second brake of said brake means with the first brake of the latter engaged being effective to maintain said ratio drive between said drive and driven shafts independent of the direction of torque flow between the shafts, and actuation of said second clutch of said clutch means with the first clutch of the latter engaged being effective to maintain direct drive between said drive and driven shafts independent of the direction of torque flow between the shafts.

5. In a transmission, a planetary gear mechanism comprising a sun gear, a ring gear, and a planet pinion carrier having single planet pinions meshing with said sun and ring gears, a drive shaft connected to said ring gear, a driven shaft connected to said planet carrier, a sun gear shaft extending coaxially of said driven shaft and having connection with said sun gear, a stationary member having an internal cylindrical brake surface extending coaxially of said sun gear shaft, brake means comprising first and second coil spring sections each being fixed at one end for rotation with said sun gear shaft, said first coil spring section being expansible radially into engagement with the cylindrical brake surface of said stationary member upon torque flow from said drive shaft to said driven shaft to hold said sun gear against rotation and provide ratio drive between said shafts, transmission shift means for selectively engaging the other end of said second coil spring section, said second coil spring section upon engagement of its other end by said transmission shift means being adapted to be expanded radially into braking engagement with said brake surface of said stationary member to maintain said ratio drive between said shafts independent of the direction of torque flow between said shafts.

6. In a transmission, a planetary gear mechanism comprising a sun gear, a ring gear, and a planet pinion carrier having single planet pinions meshing with said sun and ring gears, a drive shaft connected to said ring gear, a driven shaft connected to said planet carrier, a sun gear shaft extending coaxially of said driven shaft and having connection with said sun gear, a collar member connected to said driven shaft and having an internal cylindrical clutch surface extending coaxially of said sun gear shaft, a direct drive clutch means comprising first and second coil spring sections each being fixed at one end for rotation with said sun gear shaft, said first coil spring section being expansible radially into engagement with the cylindrical clutch surface of said collar member upon torque flow from said driven shaft to said drive shaft to connect said sun gear to said planet carrier to provide a direct drive between said shafts, transmission shift means for selectively engaging the other end of said second coil spring section, said second coil spring section upon engagement of its other end by said transmission shift means being adapted to be expanded radially into clutching engagement with the cylindrical clutch surface of said collar to maintain said direct drive between said shafts independent of the direction of torque flow between said shafts.

7. In a transmission, a planetary gear mechanism comprising a sun gear, a ring gear, and a planet pinion carrier having single planet pinions meshing with said sun and ring gears, a drive shaft connected to said ring gear, a driven shaft connected to said planet carrier, a sun gear shaft means extending coaxially of said driven shaft and having connection with said sun gear, a stationary member having an internal cylindrical brake surface extending coaxially of said sun gear shaft means and spaced therefrom to provide an annular recess therebetween, brake means comprising first and second coil spring sections each being fixed at one end for rotation with said sun gear shaft means, and disposed in said annular recess between said sun gear shaft means and said stationary member, said first coil spring section being expansible radially into engagement with the cylindrical brake surface of said stationary member upon torque flow from said drive shaft to said driven shaft to hold said sun gear against rotation to provide ratio drive between said shafts, a collar member connected to said driven shaft for rotation therewith and having an internal cylindrical clutch surface extending coaxially of said sun gear shaft means and spaced therefrom to provide an annular recess therebetween, a direct drive clutch means comprising first and second coil spring sections each fixed at one end for rotation with said sun gear shaft means and disposed in the annular recess between said sun gear shaft means and said collar member, said first coil spring clutch of said direct drive clutch means being expansible radially into engagement with the cylindrical clutch surface of said collar upon torque flow from said driven shaft to said drive shaft to connect said sun gear to said planet carrier for conjoint rotation and provide direct drive between said shafts, transmission shift means for selectively engaging the other end of either of said second coil spring sections, actuation of said second coil spring section of said brake means with the first coil spring section of the latter engaged being effective to maintain said ratio drive between said drive and driven shafts independent of the direction of torque flow between the shafts, and actuation of said second coil spring section of said direct drive clutch means with the first coil spring section of the latter engaged being effective to maintain said direct drive between said drive and driven shafts independent of the direction of torque flow between the shafts.

8. In combination, a transmission comprising a planetary gear mechanism having a sun gear, a ring gear, and a planet carrier having single planet pinions meshing with said sun and ring gears, a drive shaft connected to said ring gear, a driven shaft connected to said planet carrier, a sun gear shaft extending coaxially of said driven shaft and having connection with said sun gear, a stationary member having an internal cylindrical brake surface extending coaxially of and spaced from said sun gear shaft, brake means comprising first and second coil spring sections extending coaxially of said sun gear shaft and disposed between said sun gear shaft and said stationary member, said coil sections being fixed at their inner ends to said sun gear shaft for rotation therewith, said first coil spring section being expansible radially into engagement with a portion of said cylindrical brake surface of said stationary member upon torque flow from said drive shaft to said driven shaft, transmission shift means for selectively engaging the other end of said second coil spring section for radially expanding the latter into engagement with a portion of said cylindrical brake surface of said stationary member when said first coil spring section is expanded to lock said sun gear against rotation independent of the direction of torque flow between said shafts, throttle means adapted to control the speed of an engine or the like which is adapted to have connection with a said drive shaft, and interlock means between said transmission shift means and said throttle means for preventing actuation of said transmission shift means to actuate said second coil spring section except when said throttle means is in its open position.

9. In combination, a transmission comprising a planetary gear mechanism having a sun gear, a ring gear, and a planet carrier having single planet pinions meshing with said sun and ring gears, a drive shaft connected to said ring gear, a driven shaft connected to said planet carrier, a sun gear shaft extending coaxially of said driven shaft and having connection with said sun gear, a collar member connected to said driven shaft for rotation therewith and having an internal cylindrical clutch surface extending coaxially of said sun gear shaft and spaced from said sun gear shaft, clutch means comprising first and second coil spring section extending coaxially of said sun gear shaft and disposed between said sun gear shaft and said collar member, said coil spring section being fixed at their inner ends to said sun gear shaft for rotation therewith, said first coil spring section being expansible radially into engagement with a portion of the cylindrical clutch surface of said collar member upon torque flow from said driven shaft to said drive shaft, transmission shift means for selectively engaging the other end of said second coil spring section for radially expanding the latter into engagement with a portion of said cylindrical clutch surface of said collar member when said first coil spring section is expanded to lock said sun gear and said planet carrier together for conjoint rotation independent of the direction of torque flow between said shafts, throttle means adapted to control the speed of an engine or the like which is adapted to have connection with said drive shaft, and interlock means between said transmission shift means and said throttle means for preventing actuation of said transmission shift means to actuate said second coil spring section except when said throttle means is in its closed position.

10. In combination, a transmission comprising a planetary gear mechanism having a sun gear, a ring gear, and a planet carrier having single planet pinions meshing with said sun and ring gears, a drive shaft connected to said ring gear, a driven shaft connected to said planet carrier, a sun gear shaft extending coaxially of said driven shaft and having connection with said sun gear, a stationary member having an internal cylindrical brake surface extending coaxially of and spaced from said sun gear shaft, brake means comprising first and second coil spring sections extending coaxially of said sun gear shaft and disposed between said sun gear shaft and said stationary member, said coil spring sections being fixed at their inner ends to said sun gear shaft for rotation therewith, said first coil spring section being expansible radially into engagement with a portion of said cylindrical brake surface of said stationary member upon torque flow from said drive shaft to said driven shaft to hold said sun gear stationary and provide for ratio drive through said planetary gear mechanism, a collar member connected to said drive shaft for rotation therewith and having an internal cylindrical clutch surface extending coaxially of said sun gear shaft and spaced therefrom, direct drive clutch means comprising first and second coil spring sections each being fixed at their inner ends to said sun gear shaft for rotation therewith and disposed between said collar member and said sun gear shaft, said first coil spring section of said direct drive clutch means being expansible radially into engagement with a portion of the cylindrical clutch surface of said collar member upon torque flow from said driven shaft to said drive shaft to connect said sun gear to said planet carrier to provide a direct drive between said shafts through said planetary gear mechanism, transmission shift means for engaging the other end of either of said second coil spring sections selectively for radially expanding the latter into engagement with a portion of the cylindrical surfaces of said stationary member and said collar member when either of said first coil spring sections are expanded to effect selectively ratio or direct drive through said planetary gear mechanism independent of the direction of torque flow between said shafts, throttle means adapted to control the speed of an engine or the like which is adapted to have connection with said drive shaft, and interlock means between said transmission shift means and said throttle means for preventing actuation of said transmission shift means to selectively engage either of said second coil spring sections except when said throttle means is in a predetermined position.

11. In a transmission, a planetary gear mechanism comprising a sun gear, a ring gear, and a planet pinion carrier having single planet pinions meshing with said sun and ring gears, a drive shaft connected to said ring gear, a driven shaft connected to said planet carrier, a sun gear shaft connected to said sun gear and extending coaxially of said driven shaft, a stationary member having an internal cylindrical brake surface extending coaxially of and spaced from said sun gear shaft, brake means comprising a pair of coil spring sections extending coaxially of said sun gear shaft and disposed between the sun gear shaft and said stationary member, said coil spring sections being wound in the same direction as the direction of rotation of said drive shaft and being fixed at their inner ends to said sun gear shaft, whereby said first coil spring section is expansible radially into engagement with a portion of the cylindrical surface of said stationary member upon torque flow from said drive shaft to said driven shaft to hold said sun gear against rotation to provide a ratio drive between said drive and driven shafts through said planetary gear mechanism, and transmission shift means for selectively engaging the other end of said second coil spring section to hold the same against rotation, said second coil spring section upon engagement of its other end by said transmission shift means and with said first coil spring section expanded being adapted to be expanded radially into braking engagement to prevent rotation of said sun gear upon flow of torque from said driven shaft to said drive shaft.

12. In a transmission, a planetary gear mechanism comprising a sun gear, a ring gear, and a planet pinion carrier having single planet pinions meshing with said sun and ring gears, a drive shaft connected to said ring gear, a driven shaft connected to said planet carrier, a sun gear shaft connected to said sun gear and extending coaxially of said driven shaft, a collar member connected to said driven shaft and having an internal cylindrical clutch surface extending coaxially of and spaced from said sun gear shaft, clutch means comprising a pair of coil spring sections extending coaxially of said sun gear shaft between the sun gear shaft and said driven shaft, said coil spring sections being wound in the same direction as the direction of rotation of said drive shaft and being fixed at their inner ends to said sun gear shaft, whereby said first coil spring section is expansible radially into clutching engagement with a portion of the cylindrical surface of said collar member upon flow of torque from said driven shaft to said drive shaft to connect said sun gear to said planet carrier to provide direct drive between said drive and driven shafts through said planetary gear mechanism, transmission shift means for selectively engaging the other end of said second coil spring section, said second coil spring section upon engagement of its other end by said transmission shift means with said first coil spring section expanded being adapted to be expanded into clutching engagement with the clutch surface of said collar member to lock said driven shaft to said drive shaft for conjoint rotation independent of the direction of torque flow between said shafts.

13. In a transmission, a planetary gear mechanism comprising a sun gear, a ring gear, and a planet pinion carrier having single planet pinions meshing with said sun and ring gears, a drive shaft connected to said ring gear, a driven shaft connected to said planet carrier, a sun gear shaft connected to said sun gear and extending coaxially of said driven shaft, a stationary member having an internal cylindrical brake surface extending coaxially of and spaced from said sun gear shaft, brake means comprising a pair of coil spring sections extending coaxially of said sun gear shaft between the sun gear shaft and said stationary member, said coil spring sections being wound in the same direction as the direction of rotation of said drive shaft and being fixed at their inner ends to said sun gear shaft, whereby said first coil spring section is expansible radially into engagement with a portion of the cylindrical surface of said stationary member upon torque flow from said drive shaft to said driven shaft to hold said sun gear against rotation to provide a ratio drive between said drive and driven shafts through said planetary gear mechanism, a collar member connected to said driven shaft and having an internal cylindrical clutch surface extending coaxially of said sun gear shaft and spaced therefrom, clutch means comprising a pair of coil spring sections extending coaxially of said sun gear shaft between the sun gear shaft and said collar, said coil spring sections of said clutch means being wound in the same direction as the direction of rotation of said drive shaft and being fixed at their inner ends to said sun gear shaft, whereby said first coil spring section of said clutch means is expansible radially by torque flow from said driven shaft to said drive shaft to connect said sun gear and planet carrier together for conjoint rotation and effect direct drive between said driving and driven shafts through said planetary gear mechanism, transmission shift means for selectively engaging either of the other ends of said second coil sections of said brake means and said clutch means, whereby engagement of either of said second coil sections of either of said brake means and said clutch means with the first coil sections thereof in engagement as aforesaid providing for locking selectively either of said brake means or said clutch means for ratio or direct drive respectively, between said driving and driven shafts independent of the direction of torque flow between said shafts.

PAUL V. HAIGH.
WINTHROP S. HORTON.

REFERENCES CITED

The following references are of record in the file of this patent:

UNITED STATES PATENTS

| Number | Name | Date |
|---|---|---|
| 999,850 | Palmer | Aug. 8, 1911 |
| 1,460,813 | Harris | July 3, 1923 |
| 2,115,963 | Osborne | May 3, 1938 |
| 2,136,971 | Fleischel | Nov. 5, 1938 |
| 2,163,895 | Staples | June 27, 1939 |
| 2,207,386 | Tampier | July 9, 1940 |
| 2,292,776 | Sinclair | Aug. 11, 1942 |
| 2,318,481 | Greenlee | May 4, 1943 |
| 2,328,392 | Neracher | Aug. 31, 1943 |
| 2,371,564 | Wemp | Mar. 13, 1945 |
| 2,410,921 | Avila | Nov. 12, 1946 |

FOREIGN PATENTS

| Number | Country | Date |
|---|---|---|
| 110,883 | Great Britain | Nov. 8, 1917 |